(No Model.) 2 Sheets—Sheet 1.

C. SCHMID.
VALVE MECHANISM FOR ENGINES.

No. 528,742. Patented Nov. 6, 1894.

Witnesses
Inventor
Charles Schmid
By Price & Fisher
Atty's (No Model.) 2 Sheets—Sheet 2.
C. SCHMID.
VALVE MECHANISM FOR ENGINES.
No. 528,742. Patented Nov. 6, 1894.
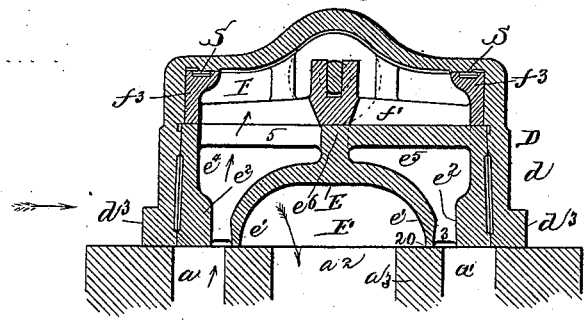
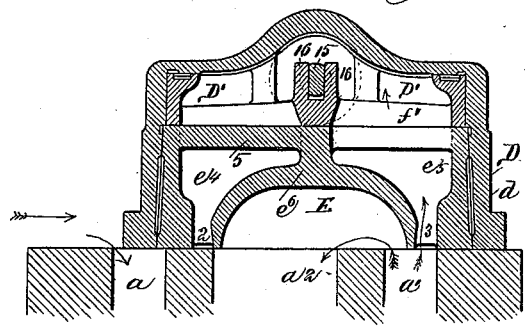
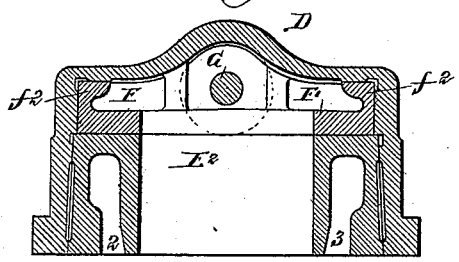
Witnesses
W. Rossiter
J. B. Carpenter
Inventor
Charles Schmid
By Peirce & Fisher
Attys.

UNITED STATES PATENT OFFICE.

CHARLES SCHMID, OF CHICAGO, ILLINOIS, ASSIGNOR TO THE AMERICAN VALVE AND GOVERNOR COMPANY, OF SAME PLACE.

VALVE MECHANISM FOR ENGINES.

SPECIFICATION forming part of Letters Patent No. 528,742, dated November 6, 1894.

Application filed July 31, 1890. Renewed April 18, 1894. Serial No. 508,047. (No model.)

*To all whom it may concern:*

Be it known that I, CHARLES SCHMID, a citizen of the United States, residing at Chicago, in the county of Cook and State of Illinois, have invented certain new and useful Improvements in Valve Mechanism for Steam-Engines, of which I do declare the following to be a full, clear, and exact description, reference being had to the accompanying drawings, forming part of this specification.

My invention has relation to the improvements of that class of valve mechanism for steam engines wherein provision is made for relieving the back pressure within the steam cylinder upon the exhaust side of the piston, so that the loss of energy, and consequent increase in working cost incident to such resistance, may be avoided. An example of this type of valve mechanism is illustrated in Letters Patent of the United States granted to me and to George Farnsworth, as my assignee, on the 10th day of August, 1886, No. 347,012. In the valve mechanism set forth in said Letters Patent, the main valve is provided with the usual exhaust cavity, common to slide valves, and upon each side of said exhaust cavity is formed an escape port through which the exhaust steam may pass from the cylinder into a chamber formed in the top of a valve, and thence by suitable openings into the exhaust cavity of the valve, and the escape port of the cylinder. These exhaust ports were controlled by a suitable valve operating horizontally, and operated from some relatively fixed part of the engine structure, so that at proper times, the escape ports on opposite sides of the exhaust cavity, would be alternately opened and closed.

The object of my present invention is to provide a more simple, cheap and effective construction of valve mechanism, and the invention consists in the various novel features of construction hereinafter described, illustrated in the accompanying drawings, and particularly defined in the claims at the end of this specification.

Figure 1:
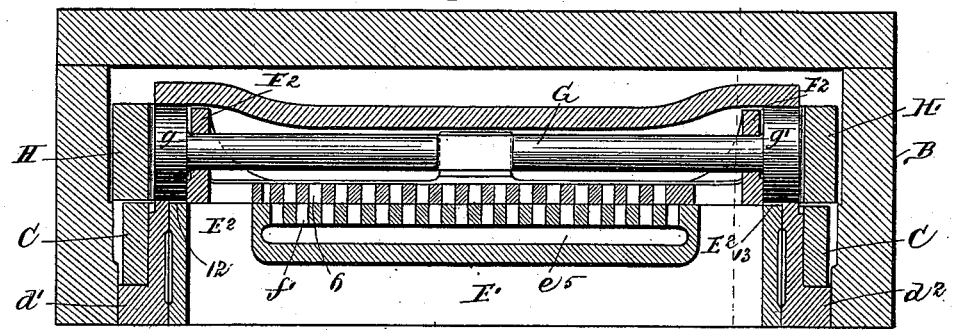
Figure 2:
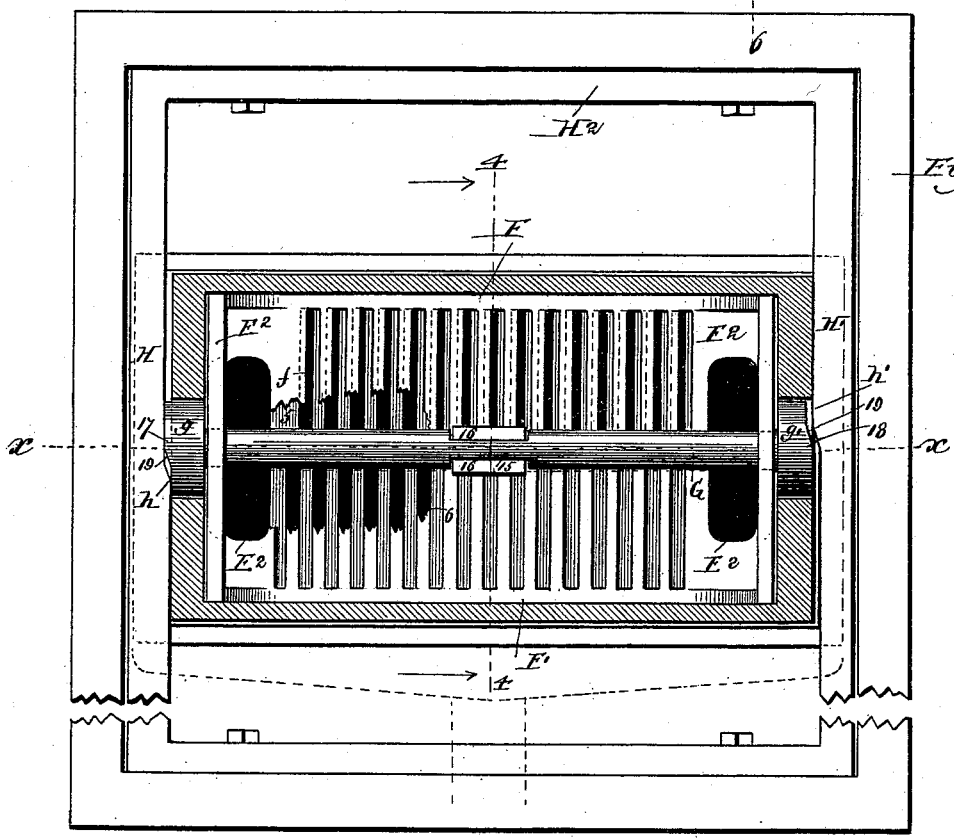
Figure 3:
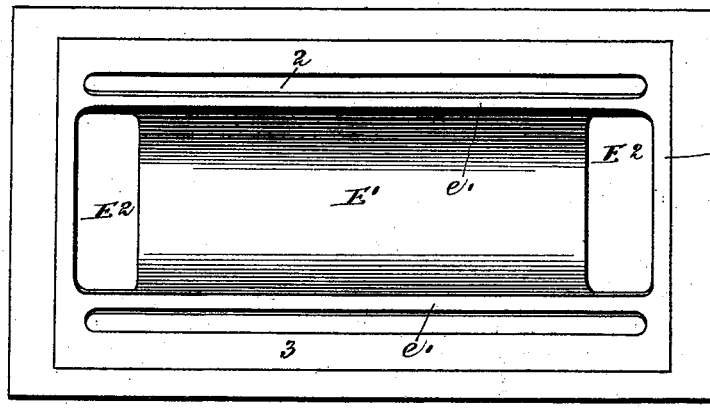

Figure 1 is a view in vertical section on line $x-x$ of Fig. 2, the shifting bar being shown in elevation. Fig. 2 is a plan view of the steam-chest with the cover removed, the main valve being shown in horizontal section, and the shifting bar and supplemental valve being shown in plan, parts of the supplemental valve being broken away to illustrate the subjacent part of the main valve. Fig. 3 is an inverted plan view of the main valve. Fig. 4 is a view in central vertical section, through the main and supplemental valves, the valve-seat being also shown. Fig. 5 is a view similar to Fig. 4, but showing the valve in shifted position. Fig. 6 is a view in vertical section on line 6—6 of Fig. 1.

A designates the main cylinder of the engine, which is provided with the usual steam-ways $a$ and $a'$.

B denotes the steam chest within which upon its appropriate seat is placed the main slide valve that is operated by a valve-rod $c$ in the usual manner, a yoke C being preferably employed for connecting the valve-rod with the valve.

The body of the main valve is by preference formed of two castings D and E, although, without departing from the spirit of my invention, these castings may be formed in single piece with slight modification. The outer casting D comprises the side walls $d$ and end walls $d'$ and $d^2$, the side walls having the base ledges $d^3$, the width of these ledges serving to determine the extent of "outside lap" to be given to the valve. The inner casting E is made of such shape as to form the exhaust cavity E' and the end escape ports $E^2$, these end escape ports leading into the exhaust cavity as shown.

Between the side walls $e'$ of the exhaust cavity and the side plates $e^2$ of the inner casting E and extending approximately from end to end of said casting, are the long exhaust ports 2 and 3, these ports opening into the chambers $e^4$ and $e^5$ in the upper part of the casting E. Through the upper part of the casting E and extending between the transverse plates $e$, is the division plate $e^6$ which serves to separate the chambers $e^4$ and $e^5$ of the casting. The top of the chamber $e^4$ is provided with a series of escape ports 5, and the top of the chamber $e^5$ is provided with a series of escape ports 6, these escape ports being in suitable number and of suitable size. I prefer however to form the escape ports of large area, not only to permit a freer exhaust of the steam, as will hereinafter appear, but also to present less surface whereon the supplemental valves will travel, thereby insuring less friction and less surface to accumulate gum in case the valve is not properly lubricated.

The castings D and E will be fastened together in any convenient manner, as for example by rivets passing through the walls of these castings. Within the chamber D' between the top of the casting E and the top of the casting D, are placed the supplemental valves F and F', the valve F having ports or openings $f$ therein corresponding to the openings 5 of one side of the exhaust chamber of the casting E, while the valve F' has ports or openings $f'$ corresponding with the escape ports 6 of the opposite exhaust chamber $e^5$ of the casting E.

For simplicity and cheapness of construction, the valves F and F' are preferably made as a single casting united together at their ends by the end plates $F^2$, these end plates being preferably extended upward approximately to the top of the casting D, which top is by preference expanded adjacent its ends as shown in Fig. 1.

I have described the supplemental valves F and F' as two distinct valves, simply because they serve to control two distinct sets of ports or openings, although a single valve serving the same purpose would obviously be within the scope of my invention; and indeed, the supplemental valves F and F', united together as they are, may be considered in effect a single valve controlling separate series of escape ports.

The openings 5 and 6 in the top of the exhaust chambers $e^4$ and $e^5$ of the casting E, and the openings $f$ and $f'$ of the valves F and F', are relatively so arranged that when the valves F F' are moved in one direction, the opening $f$ of the valve F will come coincident with the escape ports 5 of the exhaust chamber $e^4$, while the escape ports 6 of the opposite exhaust chamber $e^5$ will be closed by the valve F'. On the other hand, when the movement of the supplemental valves F F' is reversed, the opening $f'$ of the valve F' will come coincident with the ports 6 of the exhaust chamber $e^5$, while the opening 5 of the opposite exhaust chamber $e^4$ will be closed by the valve F.

By preference, the casting comprising the valves F F' is provided with the side ledges $f^2$ and $f^3$ that bear against the top of the casting D and thus serve to securely hold the supplemental valves to their seats upon the top of the casting E; and preferably also, suitable springs S will be interposed between the side ledges $f^2$ and $f^3$ and the top of the casting D in order to hold the supplemental valves in such manner that they will move only under the positive thrust of the operating mechanism, to be presently described.

In order to effect the proper movement of the supplemental valves F F' and enable these valves to open and close the escape ports 5 and 6 at the proper times, I prefer to employ the means hereinafter described, although I wish it distinctly understood that the above described portion of my invention may be employed in whole or in part, without employing the operating mechanism next described; and so also, such operating mechanism may be used in whole or in part in connection with other forms of supplemental valves for controlling the escape of the exhaust steam, without departing from the spirit of my invention.

In the end walls $d'$ $d^2$ of the main body of the valve D, are formed the openings 12 and 13 that serve to receive suitable projections extending from the end plates of the supplemental valves into position to contact with corresponding projections extending from the walls of the steam chest; and while these projections, which serve to control the movements of the supplemental valves, may be made in a variety of ways, I prefer to form them as parts of a shifting bar G, the projections constituting the ends $g$ and $g'$ of such shifting bar. This shifting bar G, in this preferred form of construction, extends not only through the end walls $d'$ of the main body of the valve, but also through the end plates $F^2$ that unite the supplemental valves.

By preference, the expanded ends or projecting portions of the shifting bar G bear against the end plates $F^2$, and preferably also this shifting bar is formed of two parts having their inner ends cut away as at 15 to sit between the vertical arms 16 that rise from the center rib $f^4$ that extends from end to end of the casting comprising the supplemental valves F F'. The ends 15 of the shifting bar-sections may be united together and to the arms 16 in any convenient manner. It is manifest that each section of the shifting bar G when thus constructed, can be conveniently inserted through the openings in the end walls of the main body of the valve and in the end plates $F^2$, and can be united together and to the arms 16. Hence it is plain that any movement imparted to the shifting bar G must produce a like movement of the supplemental valves F F', the extent of this movement being dependent upon the extent of the projections at the ends of the shifting bar G and of the projections upon the walls of the steam chest. Manifestly, other forms of projections for controlling the movements of the supplemental valves may be employed without departing from the spirit of my invention.

In order to impart to the shifting bar G the reciprocating movement necessary to cause the supplemental valves F F' to properly open and close the escape ports 5 and 6 in the tops of the exhaust chambers $e^4$ and $e^5$, I prefer to provide the steam chest with suitable bars H and H', furnished respectively with the projecting portions $h$ and $h'$, adapted to contact with the extended ends $g$ and $g'$ of the shifting bar G, and by preference also, the outer face of the end $g$ of the shifting bar is formed with a raised portion 17, while the outer face of the opposite end $g'$ of the shifting bar is formed with a correspondingly raised portion 18, each of the ends being provided with the bevel faces 19 for a purpose to be presently stated.

By reference more particularly to Fig. 2 of the drawings, it will be observed that the bars H and H' have their projecting portions so arranged with respect to each other and with respect to the ends of the shifting bar G, that when the projecting portion of one end of the shifting bar G passes off the inclined projecting portion of the bar H or H', the projecting portion of the opposite end of the shifting bar will not immediately contact with its corresponding projecting portion of the opposite bar H or H', but the main valve will travel a slight distance after the end of the shifting bar has passed off the projection of the bar H or H' before the opposite end of the shifting bar contacts with the corresponding projecting portion of its bar H or H', to effect a reverse shift of the shifting bar and supplemental valves F F'. The purpose of this arrangement, as will hereinafter more fully appear, is to enable the supplemental valves to retain their position with respect to the main valve for an instant, in order to delay the release of the steam, as will presently be seen.

I prefer to connect the bars H H' together at their ends by the cross-bars $H^2$, which cross-bars will be bolted to the ends of the steam chest, and by preference a slight space will be allowed between the bars H H' and the side walls of the steam chest, so that these bars shall be independent of any expansion of the steam chest. Preferably also, that portion of the bars H H' which is furnished with the projecting portions $h$ and $h'$, will be formed of tool steel and will be dove-tailed into the bodies of the bars H H', although this detail of construction need not necessarily be followed, it being a provision to guard against the wearing away of the projecting portion of the bars H H' incident to their contact with the shifting bar G.

By preference, the ports or openings 5 and 6 of the casting E, will be arranged in opposite series, as shown more particularly in Fig. 2, the ports of the exhaust chamber $e^4$ being out of alignment with the ports of the exhaust chamber $e^5$; and preferably also, the ports $f$ $f'$ of the supplemental valves F F' will be arranged as seen in Fig. 2 of the drawings; that is to say, with the series of ports $f$ of the valve F out of alignment with the ports $f'$ of the valve F'.

While the arrangement of ports above described is regarded as the preferred arrangement, still it may be varied without departing from the spirit of my invention.

With the foregoing construction in mind, the operation of my improved valve mechanism will be seen to be as follows:—Assume the parts to be in the relative position shown in Figs. 1, 2 and 4 of the drawings, and to be moving from such position in the direction of the arrow Fig. 4. When the parts are in the position shown in said figures, it will be noticed that the ports $f$ of the valve F and the ports or openings 5 of the exhaust chamber $e^4$, will be partially coincident; and the waste steam from the exhaust side of the piston will still be passing through the steam-way $a$, the long exhaust port 2 into the exhaust chamber $e^4$ and thence through the partially opened ports 5 and $f$ into the chamber D' beneath the top of the main valve D and thence downward through the end ports $f^5$ at the ends of the supplemental valves and through the end ports $E^2$ into the exhaust port $a^2$ of the valve seat. As the main valve is being moved from position shown in Figs. 1, 2 and 4 to the position shown in Fig. 5, it will be found that no movement of the supplemental valves F F' will occur until the raised portion or shoulder of the end $g$ of the shifting bar G strikes the inclined projecting portion $h$ of the bar H, and this striking of these parts does not occur until the main valve is moved to such extent that the bottom edge 20 of the inside lap plate $e'$ is about passing off the bridge wall $a^3$. Consequently no release of the steam occurs from the steam-way $a'$ until the edge 20 of the inside lap plate $e'$ passes off the bridge wall $a^3$, and when the inside lap plate $e'$ passes off the bridge wall $a^3$ a simultaneous release of the steam occurs directly from the steam-way $a'$, over the bridge wall $a^3$ and into the exhaust port $a^2$, and indirectly from the steam-way $a'$ up through the long escape port 3, the exhaust chamber $e^5$, through the ports or openings 6 and $f'$, into the chamber D' and thence downward through the end exhaust ports $f^5$ and $E^2$ into the exhaust ports $a^2$ of the steam chest. Hence it will be seen that by arranging the projections of the bars H H' in such manner that the supplemental valves will not be shifted until the main valve has passed a short distance beyond its mid-stroke position, I delay the release of the steam until the inside lap plate $e'$ has performed its function in retaining the steam while it is acting expansively to the desired extent, and yet at the same time, by securing the simultaneous direct and indirect release of the steam in manner just defined, I avoid the objectionable back-pressure which would arise if only a direct release of the steam from the steam-way over the bridge wall was provided. Plainly also, if the shoulders or projections upon the bars H H' were so arranged that the shifting of the supplemental valves would occur as soon as the main valve passed its mid-stroke position, the openings or ports 6 and $f'$ would come coincident before the edge 20 of the lap plate $e'$ had passed off the bridge wall, and consequently the indirect release of the steam through the long escape port 3 would begin too soon and before the inside lap plate $e'$ had fully performed its function of giving the advantage of an inside lap. In short, by allowing for the free release of the steam from the exhaust side of the piston, both direct and indirect in manner above defined, I attain the advantage incident to an inside lap and still avoid the objectionable back-pressure which has rendered the use of "inside lap" upon the valves of fast engines, impracticable. It is manifest that as the main valve continues to travel in the direction of the arrow, Fig. 5, the double (direct and indirect) release of the steam continues, and so also after the direction of travel of the main valve has been reversed to cut off the steam and allow it to act expansively, the indirect release of the steam through the long escape port 3, the exhaust chamber $e^5$, ports 6 and $f'$, exhaust chamber $D'$ and end exhaust ports 2, continues even after the edge 20 of the lap plate $e'$ has passed on to the bridge wall $a^3$, thereby cutting off the direct escape of the steam and until shortly after the valve has passed its mid-stroke position.

By my present invention I am enabled to obtain so full and free exhaust for the waste steam, that it becomes possible for me to form the valve with a very considerable amount of "inside lap." This is a feature of great importance, since it is well recognized that by the use of "inside lap" and the consequent delay in the release of the steam, the benefits to be derived from using the steam expansively are increased, but in practice the disadvantages of back-pressure, attendant upon the use of such "inside lap," has prevented its use upon slide valves of fast engines, and in fact such valves are often made with "lead," in order to better allow for the rapid exhaust of the steam from the cylinder.

One great advantage incident to the use of the retaining bar for controlling the movement of the supplemental valves F F' (and this feature will be found advantageous in the operation of other valves), is that I am enabled to instantly shift these valves so as to open and close the ports of the exhaust chamber, and to retain the ports of the exhaust chamber opened or closed so long as they can be effectively used for relieving the back-pressure of the steam and instantly close them when required. In other words, it will be seen by my present invention that the supplemental valves are instantly shifted, and when shifted, are held for some time in fixed position with respect to the main valve.

The details of construction above set out may be varied within wide limits by the skill of the mechanic, without departing from the scope of the invention, and to such details I do not wish the invention to be understood as restricted.

Having thus described my invention, what I claim as new, and desire to secure by Letters Patent, is—

1. In valve mechanism, the combination with a main valve having exhaust ports therein on each side of the exhaust cavity, and having a series of escape ports or openings through which waste steam will pass, of reciprocating supplemental valves having openings therein adapted to be brought coincident with said series of escape ports, and suitable means for reciprocating said supplemental valves, substantially as described.

2. In valve mechanism, the combination with the main valve and exhaust ports therein on each side of the exhaust cavity and having a series of long narrow escape ports or openings through which the waste steam will pass, of supplemental valves for controlling the escape of steam through said exhaust ports, said supplemental valves having a series of long narrow escape ports or openings corresponding with the ports or openings of the main valve, and suitable means for operating said supplemental valves, substantially as described.

3. In valve mechanism, the combination with the main valve having exhaust chamber in its upper portion and having exhaust ports on each side of the exhaust cavity and having a series of escape ports or openings above said escape ports through which waste steam will pass to said exhaust chamber, and having also end exhaust ports leading from said exhaust chamber to the exhaust cavity of the valve, of a supplemental valve provided with escape ports and adapted to control the escape ports or openings of the main valve, substantially as described.

4. In valve mechanism, the combination with the main valve having exhaust ports therein on each side of the exhaust cavity, of a transversely reciprocating supplemental valve within said main valve and adapted to control the escape of waste steam, and suitable means for reciprocating said supplemental valve at right angles to the path of travel of the main valve, substantially as described.

5. In valve mechanism, the combination with the main valve having exhaust ports therein on each side of the exhaust cavity, and having a series of escape ports or openings, of a supplemental valve for controlling the flow of waste steam through said escape ports or openings, a suitable mechanism for reciprocating said supplemental valves, said reciprocating mechanism being adapted to cause the supplemental valves to remain stationary with respect to the main valve for a short interval preceding the release of the steam, whereby the indirect release of the steam through the supplemental valves is delayed, substantially as described.

6. In valve mechanism, the combination with the main valve having exhaust ports therein on each side of the exhaust cavity and having also the exhaust chambers $e^4$ and $e^5$, and the main exhaust chamber $D'$ and the end exhaust ports $E^2$, and having suitable escape ports or openings 5 and 6', of the supplemental valves F and F' having escape ports or openings $f$ and $f'$, and suitable means for moving said supplemental valves, substantially as described.

7. In valve mechanism the combination with the main chambered valve having exhaust ports therein on each side of the exhaust cavity, of a transversely reciprocating supplemental valve, and means for controlling said supplemental valve comprising one or more projections united to the supplemental valve, and a corresponding projection or projections extending from the steam-chest whereby said supplemental valve may be reciprocated at right angles to the path of travel of the main valve, substantially as described.

8. In valve mechanism, the combination with a main valve, and supplemental valves therein, of means for controlling said supplemental valves comprising one or more projections united to said supplemental valve, and one or more corresponding projections extending from the steam chest, said projections having beveled portions, substantially as described.

9. In valve mechanism, the combination with a main valve having exhaust ports therein on each side of the exhaust cavity, and having escape ports or openings connecting said exhaust ports with the exhaust cavity, of supplemental valves for controlling the escape of steam through said exhaust ports and means for operating said supplemental valves comprising one or more projections extending from the supplemental valves through the main valve, and one or more corresponding projections upon the steam chest, substantially as described.

10. In valve mechanism, the combination with a main valve having exhaust ports therein on each side of the exhaust cavity, and having escape ports or openings connecting said exhaust ports with the exhaust cavity, of supplemental valves for controlling the escape of steam through said exhaust ports and operating mechanism for said supplemental valves comprising one or more beveled projections extending from the supplemental valve, and one or more beveled projections extending from the steam chest to engage said projection or projections that extend from the supplemental valve, substantially as described.

11. In valve mechanism, the combination with a main valve having exhaust ports therein on each side of the exhaust cavity, and having escape ports or openings connecting said exhaust ports with the exhaust cavity, of supplemental valves for controlling the escape of steam through said exhaust ports said supplemental valves being united together, and having projections extending through the main valve, and suitable projections from the steam chest to engage said projections from the supplemental valves, substantially as described.

12. In valve mechanism, the combination with a main valve having exhaust ports therein on each side of the exhaust cavity, and having escape ports or openings connecting said exhaust ports with the exhaust cavity, of supplemental valves for controlling the escape of steam through said exhaust ports and means for operating said supplemental valves comprising a shifting bar extending through said main valve at each end, and connected with the supplemental valves, said shifting bar having beveled projections upon its ends, and suitable projections from the walls of the steam chest to engage said projections on the ends of the shifting bar, substantially as described.

13. In valve mechanism, the combination with the body of the main valve, of the casting E, having exhaust chambers $e^4$ $e^5$ formed with ports 2 and 3 and having the exhaust ports or openings leading from said exhaust chambers to the exhaust chamber D', supplemental valves comprising plates united at their ends, and having openings adapted to be brought coincident with the ports or openings in the exhaust chamber, and a shifting bar extending through the ends of the main valve, the exhaust chamber, and connected with the supplemental valves, substantially as described.

14. In valve mechanism, the combination with a main valve having exhaust ports for waste steam, and a supplemental valve for controlling said exhaust ports, of a shifting bar connected to said supplemental valve, and suitable bars H and H' and end bars $H^2$ to which said bars H and H' are connected, said end bars being attached to the steam chest, substantially as described.

CHARLES SCHMID.

Witnesses:
 GEO. P. FISHER, Jr.,
 H. E. COMPTON.